(12) United States Patent
Maxant et al.

(10) Patent No.: US 11,598,075 B2
(45) Date of Patent: Mar. 7, 2023

(54) RECYCLING DEVICE AND A METHOD THEREIN FOR RECYCLING USED WATER FROM A USED WATER SOURCE

(71) Applicant: MIMBLY AB, Gothenburg (SE)

(72) Inventors: Nicolas Maxant, Gothenburg (SE); Miguel Estruch Soler, Gothenburg (SE); Carl Emil Vestman, Gothenburg (SE); Roger Gustavsson, Örnsköldsvik (SE)

(73) Assignee: MIMBLY AB, Gothenburg (SE)

( * ) Notice: Subject to any disclaimer, the term of this patent is extended or adjusted under 35 U.S.C. 154(b) by 313 days.

(21) Appl. No.: 16/771,812

(22) PCT Filed: Dec. 10, 2018

(86) PCT No.: PCT/SE2018/051263
§ 371 (c)(1),
(2) Date: Jun. 11, 2020

(87) PCT Pub. No.: WO2019/117789
PCT Pub. Date: Jun. 20, 2019

(65) Prior Publication Data
US 2021/0172156 A1   Jun. 10, 2021

(30) Foreign Application Priority Data
Dec. 14, 2017 (SE) .................... 1751551-1

(51) Int. Cl.
*E03B 1/04*     (2006.01)
*D06F 39/00*    (2020.01)
(Continued)

(52) U.S. Cl.
CPC ............ *E03B 1/041* (2013.01); *D06F 39/006* (2013.01); *E03B 1/042* (2013.01); *A47L 15/4291* (2013.01);
(Continued)

(58) Field of Classification Search
CPC ..... E03B 1/041; E03B 1/042; E03B 2001/045
See application file for complete search history.

(56) References Cited

U.S. PATENT DOCUMENTS 5,173,180 A   12/1992  Stewart
6,132,138 A * 10/2000  Haese ...................... C05F 7/00
                                                 210/170.07
(Continued)

FOREIGN PATENT DOCUMENTS

DE   4212688   10/1993
EP   1036888    9/2000

*Primary Examiner* — Kevin F Murphy
(74) *Attorney, Agent, or Firm* — Duane Morris LLP; Gregory M. Lefkowitz; Joaquin Hernandez

(57) ABSTRACT

A recycling device (200) for recycling used water from at least one used water source (100, 101) is provided. The recycling device (200) comprises a first water tank (210) arranged to receive used water from the at least one water source (100), and sensor means (211) arranged to measure the water quality of used water in the first water tank (210). The recycling device (200) is characterized in that it comprises a second water tank (220) arranged to store used water within the recycling device (200), and a water pump (240) and one or more valves (231, 232, 233, 234, 235; 301). The pump (240) and one or more valves (231, 232, 233, 234, 235; 301) arranged in the recycling device (200) such that used water is able to be stored in the second water tank (220), or recycled out of the recycling device (200) from the first water tank (210) or from the second water tank (220), when the water quality of the used water is above a determined threshold level. Also, a method and a computer program performed and executed in the recycling device (200) for recycling used water from at least one used water source (100, 101) are also provided.
Furthermore, a recycling system (400) comprising a recycling device (200) and at least one used water source (100, (Continued)

101) and a recycling system (400) comprising a recycling device (200), at least one used water source (100, 101) and at least one water consumption device (100, 102) are also provided.

15 Claims, 6 Drawing Sheets

(51) Int. Cl.
     *A47L 15/42*         (2006.01)
     *D06F 33/46*        (2020.01)
(52) U.S. Cl.
     CPC ........ *D06F 33/46* (2020.02); *E03B 2001/045* (2013.01)

(56) References Cited

U.S. PATENT DOCUMENTS

| | | | |
|---|---|---|---|
| 7,404,926 B2* | 7/2008 | Rhoades | B01D 61/18 422/62 |
| 9,528,935 B2* | 12/2016 | Pulyassary | G01N 21/59 |
| 2011/0036410 A1 | 2/2011 | Tontegate | |
| 2011/0210049 A1* | 9/2011 | O'regan, Jr. | G05B 19/4185 210/85 |
| 2011/0253604 A1* | 10/2011 | Mercer | C01B 13/11 210/150 |
| 2011/0308618 A1* | 12/2011 | Lorenz | E03B 1/042 137/1 |
| 2012/0199220 A1 | 8/2012 | Knepp et al. | |
| 2013/0180928 A1 | 7/2013 | Vielma | |
| 2016/0115675 A1 | 4/2016 | Quigley et al. | |

* cited by examiner

RECYCLING DEVICE AND A METHOD THEREIN FOR RECYCLING USED WATER FROM A USED WATER SOURCE

CROSS-REFERENCE TO RELATED APPLICATIONS

This application is a § 371 national stage entry of International Application No. PCT/SE2018/051263, filed Dec. 10, 2018, which claims priority of Sweden National Application No. 1751551-1, filed Dec. 14, 2017, the entire contents of which are incorporated herein by reference.

TECHNICAL FIELD

Embodiments herein relate to recycling of used water from a used water source. In particular, embodiments herein relate to a recycling device and method therein for recycling of used water from a used water source. Also, embodiments herein further relate to a recycling system comprising a recycling device and a used water source.

BACKGROUND

Water is one of earth's most important resources, and water scarcity is becoming a big problem even in regions in which water availability has traditionally not been an issue. A big part of this problem is created by the way water is consumed and inherent consumer behaviours connected thereto. Water that is safe to drink or to use for food preparation without risk of health problems, i.e. potable water or improved drinking water, is today used to perform tasks for which such a high purity is not necessary, such as, for example, washing our clothes, cleaning our cars, etc. Moreover, this potable water tends to be used once only, and is thrown away or discarded even if it may be possible to reuse.

Many innovations have been developed to deal with this problem. For example, there are machines, such as, e.g. modified industrial washing machines, that are capable of producing drinkable water out of from its contaminated waters. Other example are shower systems that are purifying water for further use in the same shower system, and eco-friendly dish washers that are consuming less water than their predecessors. However, a disadvantage of these existing solutions is that they are not accessible. This means that the solutions are either expensive, not energy efficient enough, or difficult to install.

US 2013/0180928 A1 describes a water conservation system comprising grey water discharge lines, an impurity measuring unit, a buffer tank, a water treatment unit and a treated water tank. In this US 2013/0180928 water is always fed to a main sewage line, or to a toilet limiting the potential for water savings.

Hence, there is a need to provide more accessible and easy to use devices for recycling used water, in both domestic and industrial settings.

SUMMARY

It is an object of embodiments herein to provide a more accessible recycling device for recycling used water.

According to a first aspect of embodiments herein, the object is achieved by a recycling device for recycling used water from at least one used water source. The recycling device comprises a first water tank arranged to receive used water from the at least one used water source, and a first sensor means arranged to measure the water quality of used water in the first water tank. The recycling device further comprises a second water tank arranged to store used water within the recycling device, a water pump and one or more valves. The pump and one or more valves are arranged in the recycling device such that used water is able to be recycled out of the recycling device from the first water tank or be stored in the second water tank when the water quality of the used water is above a determined threshold level, or to be discharged out of the recycling device from the first water tank when the water quality of the used water is below the determined threshold level.

This recycling device advantageously provides a self-contained unit that is able to be connected to existing domestic or industrial used water sources for recycling their outputted used water. This means, for example, that the need to purchase a new washing machine or dish washer when attempting to reduce water consumption is eliminated, which makes the recycling device a cheap and cost effective solution. The outputted used water may, for example, be recycled back into the used water source directly or may be provided to other water consumption devices connected thereto. Hence, through its cost effectiveness, its retrofitting capabilities or characteristics, i.e. compatibility with existing used water sources, and its ease of use, a more accessible recycling device for recycling used water is provided.

It should also be noted that a further advantage of the recycling device is that it is not intended to purify water to reach drinkable standards, i.e. to provide potable water, but rather to ensure the water quality is good enough for the used water to be recycled and used in various different applications, such as, washing machines, dishwashers, etc.

In some embodiments, the water pump and one or more valves are further arranged in the recycling device such that used water stored in the second water tank is able to be recycled out of the recycling device from the second water tank.

In some embodiments, the recycling device may further comprise control means configured to control the pump and the one or more valves to recycle used water out of the recycling device from the first water tank or the second water tank when at least one water consumption device connected to the recycling device is determined to be in need of water.

In some embodiments, the recycling device may further comprise control means configured to control the pump and the one or more valves to discharge the used water out from the first water tank when the second water tank is determined to be full and at least one water consumption device connected to the recycling device is determined not to be in need of water, or when information indicating that the used water in the first water tank is to be discharged has been received.

In some embodiments, the recycling device may further comprise control means configured to control the pump and the one or more valves to discharge the used water from the second water tank when the used water in the second water tank is determined to have been stored for a determined period of time or information indicating that the used water in the second water tank is to be discharged has been received in the control means.

In some embodiments, the recycling device may further comprise control means configured to control an antimicrobial system provided in the second water tank to avoid microbial growth in the second water tank. In some embodiments, the recycling device may further comprise control means which is connected to or comprise a connectivity device configured to wirelessly communicate with external devices.

It should be noted that the control means described above may comprise a processor and a memory, wherein the memory is containing instructions executable by the processor.

Further, according to some embodiments, the recycling device may further comprise a first filtering means arranged to filter the used water from the at least one used water source and/or a second filtering means arranged to filter used water from the first water tank and the second water tank. In this case, according to some embodiments, the first and/or second filtering means comprise a pre-filter and a subsequent filter, wherein the subsequent filter has a pore size which is lower than a pore-size of the pre-filter.

In some embodiments, the control means may be further configured to control the pump and the one or more valves based on the measured water quality from the first sensor means, wherein the measured water quality from the first sensor means comprise one or more of: the electrical conductivity, the temperature and the turbidity of the used water within the first water tank. In some embodiments, the first sensor means may further be arranged to measure the amount of used water in the first water tank. In this case, the control means may be further configured to control the pump and the one or more valves based on the amount of used water in the first water tank indicated by the first sensor means.

In some embodiments, the recycling device may further comprise a second sensor means arranged to measure the amount of used water in the second water tank. In this case, the control means may be further configured to control the pump and the one or more valves based on the amount of used water in the second water tank indicated by the second sensor means. In some embodiments, the second sensor means may further be arranged to measure the water quality of the used water in the second water tank, wherein the measured water quality from the second sensor means comprise one or more of: the electrical conductivity, the temperature and the turbidity of the used water within the second water tank. In this case, the control means may be further configured to control the pump and the one or more valves based on the measured water quality from the second sensor means.

According to a second aspect of embodiments herein, the object is achieved by a recycling system comprising at least one used water source and a recycling device as described above. According to a third aspect of embodiments herein, the object is achieved by a recycling system comprising at least one used water source, at least one water consumption device and a recycling device as described above.

According to a fourth aspect of embodiments herein, the object is achieved by a method performed in a recycling device for recycling used water from at least one used water source. The recycling device receives used water from the at least one water source in a first water tank. Also, the recycling device measures the water quality of used water in the first water tank. Then, the recycling device determines if the water quality of used water is above or below a determined threshold level. If the water quality is above the determined threshold level, then the recycling device may either recycle the used water out of the recycling device from the first water tank or store the used water in a second water tank in the recycling device. If the water quality is below the determined threshold level, the recycling device may discharge the used water out of the recycling device from the first water tank.

In some embodiments, the recycling device may recycle used water stored in the second water tank out of the recycling device from the second water tank. In some embodiments, the recycling device may recycle used water from the first water tank or recycle used water from the second water tank when at least one water consumption device connected to the recycling device is determined to be in need of water. In some embodiments, the recycling device may discharge used water out from the first water tank when at least one water consumption device connected to the recycling device is determined not to be in need of water and the second water tank is determined to be full, or when information indicating that the used water in the first water tank is to be discharged has been received. In some embodiments, the recycling device may discharge used water from the second water tank when the used water in the second water tank is determined to have been stored for a determined period of time or information indicating that the used water in the second water tank is to be discharged has been received.

According to a fifth aspect of the embodiments herein, computer programs are also provided configured to perform the methods described above. Further, according to a sixth aspect of the embodiments herein, carriers are also provided configured to carry the computer programs configured for performing the methods described above.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
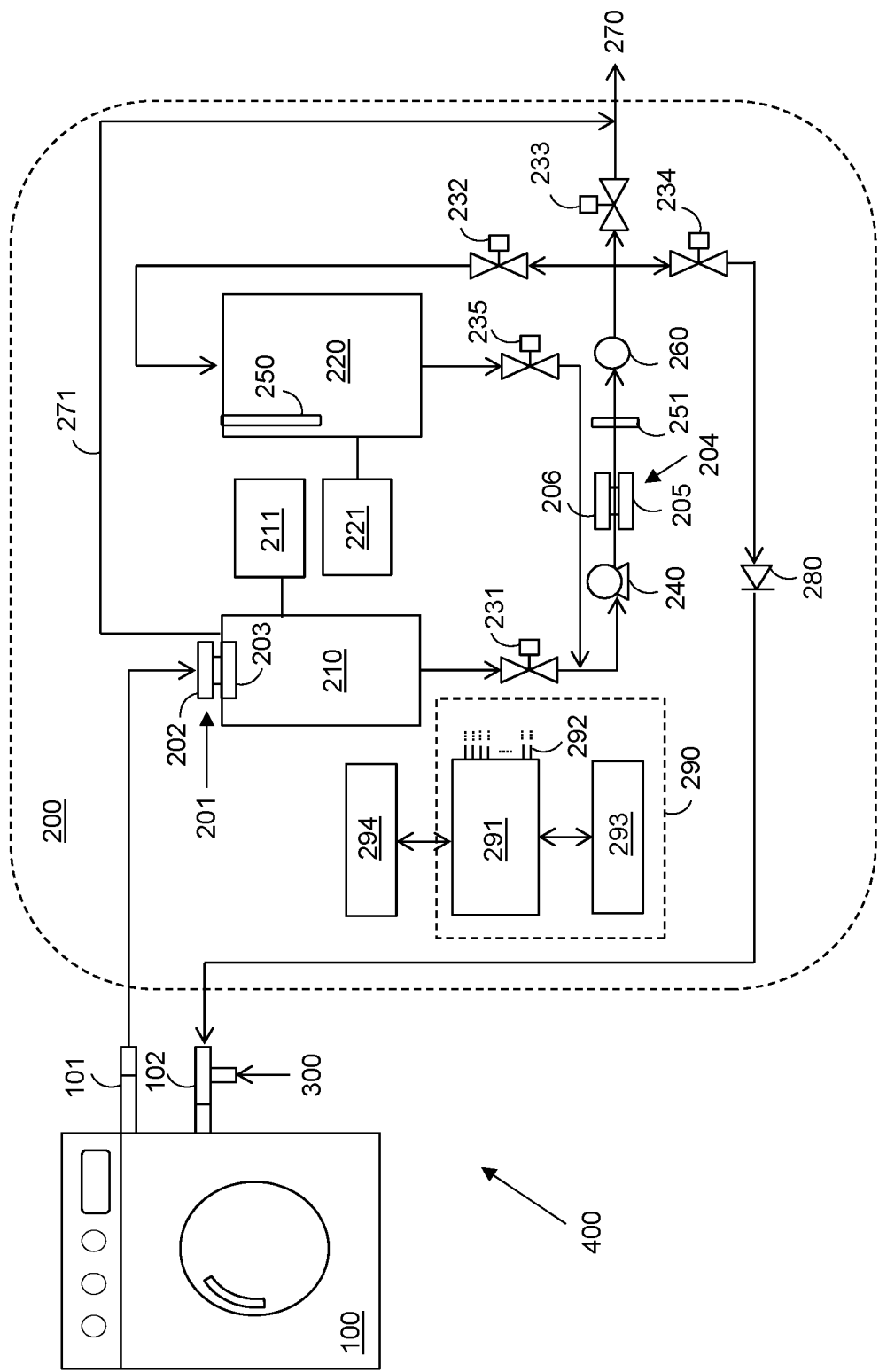
FIG. 1 is a schematic block diagram illustrating embodiments of a recycling device and a recycling system.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a recycling system 400 comprising a used water source 100 and a recycling device 200 according to embodiments described herein. The used water source 100 may comprise a water outlet 101 for discharging or discarding used water from the used water source 100. The water outlet 101 may be the outlet of the used water source 100 normally leading to a sewer or external water collector, etc. The used water source 100 may also comprise water inlet 102 for retrieving water to be used when operating the used water source 100. In this case, the used water source 100 may also be referred to as a water consumption device. As shown in FIG. 1, the water inlet 102 may be arranged to be connected to both the recycling device 200 and a clean water source 300, such as, e.g. a water tap or other water supply. Although many different applications of the used water source 100 may be envisioned, some examples may comprise one or more washing machine(s), one or more dish washer(s), one or more industrial washing machine(s), or any combination thereof, etc.

It should also be noted that, although the recycling device 200 is here shown as collecting the used water from the water outlet 101 of the used water source 100 and recycling water back to the used water source 100 via the water inlet 102, the recycling device 200 may optionally be connected to another water inlet of another water consumption device (not shown). For example, if the used water source 100 is a washing machine, the recycling device 200 may be arranged to output or recycle the recycled water to e.g. a toilet, dish washer or another washing machine. Furthermore, as shown in FIG. 1, the recycling device 200 is arranged to receive the used water from the used water source 100. The recycling device 200 may comprise a water inlet (not shown) arranged to be connected to the water outlet 101 of the used water source 100. The recycling device 200 may also comprise a power supply (not shown) capable of providing energy to the recycling device 200 by transforming the current from the mains into a current usable for the various parts of the recycling device 200.

As water can be continuously recycled to a water source 100, the recycling device 200, results in a greater degree of potential water consumption reduction. As long as water quality is sufficient it may be continuously recycled to the water source 100. As stated above, water may also be recycled to a separate or additional water consumption device.

To facilitate the understanding of the recycling device 200 and as an overview, the recycling device 200 may be briefly described as a plug-and-play device or solution which allows itself to be easily connected to a used water source 100 for the purpose of recycling used water being discharged or discarded therefrom. It has an advantage over known water recycling systems as it does not require the interconnection of a plurality of water providing and water consuming devices, or even waste lines etc. The recycling device 200 enables water to be recycled back to the used water source 100. Generally, after receiving the used water from the used water source 100, the recycling device 200 may purify the used water through different filters and determine or assess the quality of the used water using different sensors. If the water quality is deemed to be good enough, the used water may be recycled back to the used water source 100 or any other water consumption device. This may be performed directly after determining or assessing the quality of the used water or by first storing it internally within the recycling device 200 before being recycled. If the water quality is not deemed to be good enough, the used water may be directly sent to the sewer or external water collector, etc. A more detailed description of embodiments of the recycling device 200 and method therein is described below with reference to FIGS. 1-6.

According to the embodiments in FIG. 1, the used water from the used water source 100 is fed into and received in a first water tank 210. Optionally, according to some embodiments, the used water from the used water source 100 may be fed via a first filtering means 201. In this case, the first filtering means 201 is arranged to purify or clean the used water to a certain extent, depending on its configuration, before the used water enters the first water tank 210. Examples of suitable filters may be, for example, particle filters, carbon activated filters, antimicrobial filters and/or UV filters.

In some embodiments, the first filtering means 201 may comprise at least one particle filter. In this case, the first filtering means 201 may comprise a pre-filter 202 and a subsequent filter 203. Here, the subsequent filter 203 may be arranged with a pore size which is lower than a pore-size of the pre-filter 202. According to one example, the pre-filter 202 may have a pore size of about 50 μm or higher, and the subsequent filter 203 may have a pore size of about 1 μm or higher (but not higher than the pore size of the pre-filter 202). The first water tank 210 may also comprise an overflow protection connection 271 allowing excess used water in the first water tank 210 to be expelled from the first tank 210 and out of the recycling device 200.

In the first water tank 210, the quality of the used water from the used water source 100 may be measured by a first sensor means 211. In this aspect, the first water tank 210 may also be referred to as a water quality tank or water quality assessment tank. The first sensor means 211 may comprise a number of different sensors and measuring equipment. The first sensor means 211 may be arranged to measure different water and water quality related parameters of the used water, such as, e.g. the flow of the used water into or out of the first water tank 210, the amount of used water or water level in the first water tank 210, and the quality of the used water in the first water tank 210. For example, the first sensor means 211 may comprise a volumetric flow or mass flow meter for determining the flow of the used water. The volumetric flow or mass flow meter may be invasive or non-invasive, and may be based on different measurement parameters, such as, mechanical movement, pressure, optics, etc. Also, the first sensor means 211 may also comprise a water level detector based on, for example, a point level or continuous level detection. The water level detection may be based on different measurement parameters, such as, pressure, conductivity, ultrasound, floats, capacitance, optics, etc.

Also, the first sensor means 211 may comprise water quality sensors. The water quality sensors may comprise sensors arranged to measure the electrical conductivity (EC), the temperature and the turbidity of the used water within the first water tank 210. The water quality sensors may further comprise sensors arranged to measure one or more of: RGB colour of the used water; adenosine triphosphate, ATP, levels of the used water, pH-level of the used water, the amount of Dissolved Oxygen, DO, in the used water, COD/BOD, Chemical/Biological Oxygen Demand, levels of the used water, concentration of suspended or dissolved solids in the used water, etc. As can be seen, there are many different parameters that may be measured by different sensors in the first sensor means 211 and then assessed in order to determine the water quality of the used water in the first water tank 210.

According to an illustrative example, by measuring electroconductivity or electrical conductivity (EC) of the used water, which refers to the ability of the used water to allow the transport of electrical charges, the presence of ions in the used water may be determined. This is because these are highly related, e.g. the higher the concentration of ions, the higher the EC. EC is further related to the concentration of total dissolved solids (TDS), and an approximation of the TDS in the used water may also be obtained from the measure of the electroconductivity. However, measuring the EC is affected by the temperature of the used water, and in case the EC sensor does not measure temperature, a separate temperature sensor may be required. In view of the above, EC may be a suitable parameter to use for assessing the quality of the used water when the used water is to be recycled into, for example, a washing machine. For example, the water quality of the used water may be measured by the difference in EC between the used water and water from a clean water source, e.g. tap water. This may depend on in which geographical location the recycling device 200 is being used, since the EC value of the tap water may depend on the geographical location. Regardless, the used water expelled from a washing machine typically has a higher EC value than the tap water because of an increase in the concentration of ions and dissolved solids in the water, e.g. from detergent and dirt. The assessment of the water quality of the used water may be based on this increase.

Furthermore, the first sensor means 211 may also be arranged to measure the quality of the first filtering means 201, e.g. by being connected to the first filtering means 201 or by analysing the used water in the first water tank 210. The quality of the first filtering means 201 may for example be measured by analysing, for example, turbidity, pressure and/or the water flow of the used water. The water level of the used water in the first water tank 210 may also be measured and analysed for this purpose.

In addition, the first sensor means 211 may also be arranged to communicate with, and provide measurement and/or measurement information to, a control means 290. The first sensor means 211 may, for example, be electrically connected to the control means 290 via the ports 292.

An outlet of the first water tank 210 may be connected to a first valve 231. The first valve 231 may be connected to and controlled by the control means 290, e.g. electrically via the ports 292. This means that the first valve 231 may be turned on/off by the control means 290. The outlet of the first valve 231 may be connected to an inlet of a pump 240. The pump 240 is arranged to pump the used water within the recycling device 200, i.e. make the used water flow through the connections within the recycling device 200. The pump 240 may be connected to the control means 290, e.g. electrically via the ports 292. The pump 240 may also be controlled by the control means 290, i.e. the pump 240 may be turned on/off by the control means 290. The outlet of the pump 240 may be connected to a second, third and fourth valve 232, 233, 234. The second, third and fourth valve 232, 233, 234 may be connected to the control means 290, e.g. electrically via the ports 292. The second, third and fourth valve 232, 233, 234 may also be controlled by the control means 290, i.e. the second, third and fourth valve 232, 233, 234 may be turned on/off by the control means 290.

The outlet of the second valve 232 may be connected to the inlet of a second water tank 220. This enable the pump 240 to pump used water from the first water tank 210 into the second water tank 220. The second water tank 220 is arranged to receive and store used water from the first water tank 210. Since the second water tank 220 is to be used for water storage, the second water tank 220 may be larger than the first water tank 210 used for determining or assessing the quality of the used water. However, it should also be noted that the second water tank 220 may also be connected to a second sensor means 221. The second sensor means 220 may be arranged to measure different water and water quality related parameters of the used water, such as, e.g. the flow of the used water into or out of the second water tank 220, the amount of used water or water level in the second water tank 220, and the quality of the used water in the second water tank 220. The second sensor means 220 may be partially or completely identical to the first sensor means 211. Also, the second sensor means 220 may be arranged to communicate with, and provide measurement and/or measurement information to, the control means 290. The first sensor means 211 may, for example, be connected to the control means 290, e.g. electrically via the ports 292. Furthermore, the second water tank 220 may also be provided with a first antimicrobial system 250 to avoid bacterial growth in the second water tank 220. The first anti-microbial system 250 may be a system based on, for example, electrolysis, UV light, and/or ozone. The first anti-microbial system 250 may be controlled by the control means 290 and be arranged to communicate with, and provide measurement and/or measurement information to, the control means 290. The first anti-microbial system 250 may, for example, be connected to the control means 290, e.g. electrically via the ports 292. The first anti-microbial system 250 may also be controlled by the control means 290, i.e. the anti-microbial system 250 may be turned on/off by the control means 290. Furthermore, an outlet of the second water tank 210 may be connected to a fifth valve 235. The fifth valve 235 may be connected to and controlled by the control means 290, e.g. electrically via the ports 292. This means that the fifth valve 235 may be turned on/off by the control means 290. The outlet of the fifth valve 235 may be, similar to the outlet of the first valve 231, connected to the inlet of the pump 240.

The outlet of the third valve 233 may be connected to an outlet 270 of the recycling device 200, wherein the outlet 270 may lead to a sewer or external water collector, etc. This enable the pump 240 to pump used water from the first water tank 210 and used water from the second water tank 220 out of the recycling device 200.

The outlet of the fourth valve 234 may be connected to the inlet 102 of a water consumption device; in this example, back to the used water source 100. This enables the pump 240 to pump used water from the first water tank 210 or from the second water tank 220 out from the recycling device 200, i.e. recycling the used water. Optionally, a flow valve 280 may be arranged between the fourth valve 234 and the inlet 102 in order to allow the used water to only flow in one direction. The flow 280 may, for example, be a check valve, a non-return valve or one-way valve 280, or other similar valve.

According to some embodiments, a second filtering means 204 may be arranged between the pump 240 and the second, third and fourth valve 232, 233, 234. In this case, the second filtering means 204 is arranged to further purify or clean used water from the first water tank 210 and used water from the second water tank 220. The second filtering means 204 may be identical or similar to the first filtering means 201 described above. In some embodiments, the second filtering means may be at least one particle filter, and may also comprise a pre-filter 205 and a subsequent filter 206 similar to the ones described in reference to the first filtering means 201 above. In some embodiments, a second anti-microbial system 251 may also be arranged between the pump 240 and the second, third and fourth valve 232, 233, 234, or optionally, in the first water tank 210. The second anti-microbial system 251 may be the same or similar to the first anti-microbial system 250.

Additionally, in some embodiments, a first flow meter 260 may further be arranged between the pump 240 and the second, third and fourth valve 232, 233, 234. The first flow meter 260 may also be arranged to communicate with, and provide measurement and/or measurement information to, a control means 290. The first flow meter 260 may, for example, be electrically connected to the control means 290 via the ports 292.

Water from the water source 100, the first water tank 210, the second water tank 220 may be mixed with clean water from the clean water source 300. If the water quality, especially of water in the second water tank 220, is below the threshold value for recycling then this low quality water may be recycled by mixing the low quality water with water from the clean water source 300 to achieve an improved water quality. Low quality water may be mixed with clean water at a range of ratios depending on the quality of the water. For example, water may be mixed at a low quality water:clean water ratio of 1:10, 1:1, 10:1, or any ratio resulting in sufficiently high quality water being provided to the water consumption device 100.

As described above, the recycling device 200 may comprise control means 290. The control means 290 may comprise at least one processor 291 and at least one memory 293. The at least one processor 291 may, for example, be one or more microprocessor. The memory 293 may be any suitable type of data storage, such as, e.g. a volatile or non-volatile, removable or non-removable storage media. For example, the memory 293 may be an SD card, a flash memory integrated circuit implemented on a Printed Circuit Board, PCB, directly, a USD-drive, etc. The control means 290 may be implemented on a PCB mounted with various integrated circuits. Moreover, the control means 290 may be connected to or comprise a connectivity device 294. The connectivity device 294 may be arranged to wirelessly communicate with external devices, for example, using a common communication protocols, such as, WiFi or Bluetooth. This enables, for example, the control means 290 to receive information or command from external devices, such as, for example, a mobile device or terminal.

The control means 290, e.g. the integrated circuits of a PCB, may be connected via the ports 292 to the first sensor means 211, the first, second, third, fourth and fifth valve 231-235, the pump 240, the second sensor means 221, the first and second anti-microbial systems 250, 251, and the flow meter 260. Hence, the control means 290, i.e. the at least one processor 291, may control and communicate with each of the first sensor means 211, the first, second, third, fourth and fifth valve 231-235, the pump 240, the second sensor means 221, the first and second anti-microbial systems 250, 251, and the flow meter 260. This also means that the control means 290 is arranged to control the flow of used water through the recycling device 200. For example, depending on the measurements and information provided by the first and second sensor means 211, 221, the first and second anti-microbial systems 250, 251, and/or the flow meter 260, the control means 290 may control or pilot the first, second, third, fourth and fifth valve 231-235 and the pump 240 to either: transfer or direct the used water from the first water tank 210 to the second water tank 220, recycle the used water from the first water tank 210 or from the second water tank 220 out of the recycling device 220, or discharge the used water from the first water tank 210 or from the second water tank 220 out of the recycling device 220.

It should further be noted that the embodiments for recycling used water from at least one used water source described below may be implemented through the one or more processors 291 depicted in FIG. 1, together with computer program code for performing the functions and actions of the embodiments herein. The program code mentioned above may also be provided as a computer program product, for instance in the form of a data carrier carrying computer program code or code means for performing the embodiments herein when being loaded into the one or more processors 291 of the control means 290 in the recycling device 200. The computer program code may e.g. be provided as pure program code in the recycling device 200 or on a server and downloaded to the recycling device 200. Thus, it should be noted that modules dedicated to perform each of the actions described below in the control means 290 in the recycling device 200 may in some embodiments be implemented as computer programs stored in the memory 293 for execution by the at least one processor 291 or processing modules therein. Those skilled in the art will also appreciate that the one or more processors 291 and the memory 293 described above may refer to a combination of analog and digital circuits, and/or one or more processors configured with software and/or firmware, e.g. stored in a memory, that when executed by the one or more processors 291 perform the action described below. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 2:
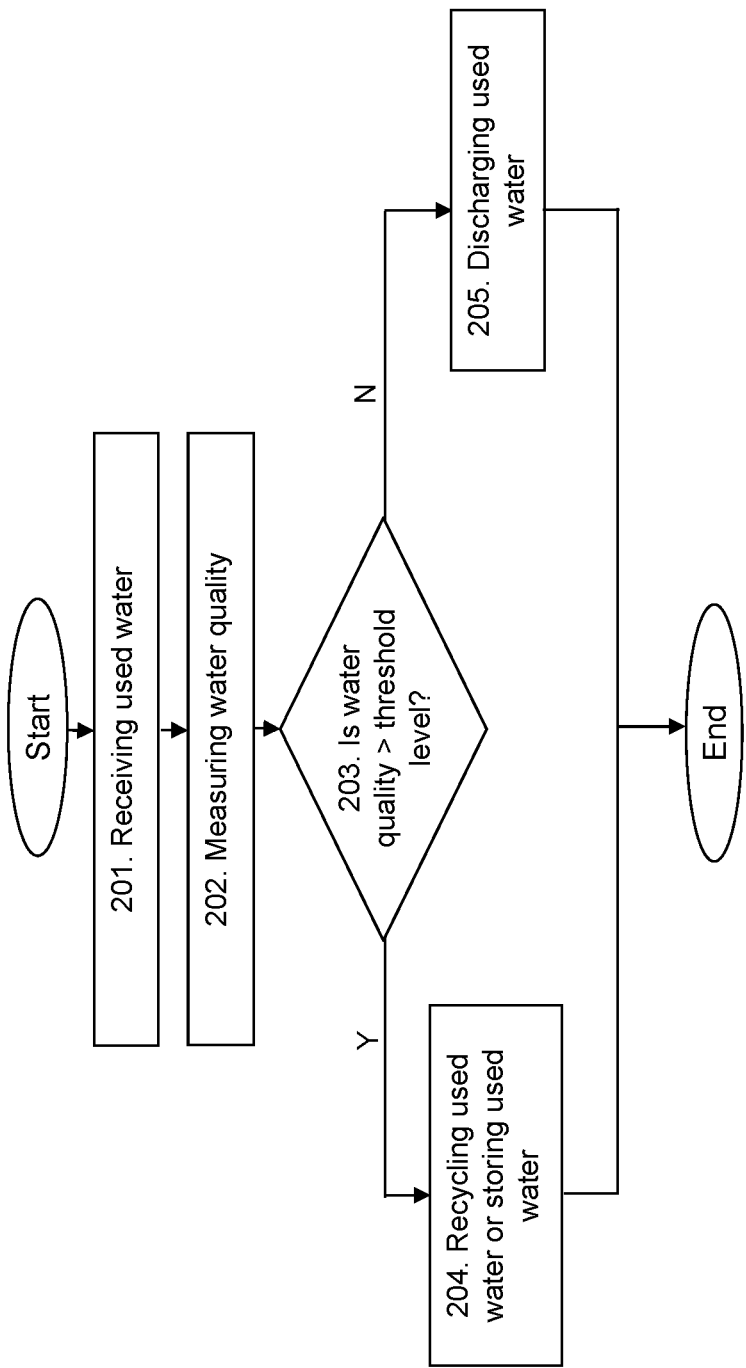
FIG. 2 is a flowchart depicting embodiments of a method in a recycling device.

More detailed description of the overall function of the recycling device 200 is described below by the embodiments of the method described in reference to the flowchart in FIG. 2.

Example of embodiments of a method performed in a recycling device 200 for recycling used water from at least one used water source 100, 101 will now be described with reference to the flowchart depicted in FIG. 2. FIG. 2 is an illustrated example of actions or operations which may be taken by the recycling device 200.

Action 201

The recycling device 200 receives the used water from the at least one water source 100 in a first water tank 210. This means that the water discharged by the at least one water source 100 is collected by the recycling device 200 in the water quality assessment tank 210, i.e. the first water tank 210.

Action 202

The recycling device 200 also measures the water quality of used water in the first water tank 210. As described above in reference to FIG. 1, this may be performed by the first sensor means 211 in the recycling device 200.

Action 203

After receiving the measurement or measurement information from the first sensor means 211, the recycling device 200 may determine if the water quality of used water is above or below a determined threshold level. In other words, the control means 290 in the recycling device 200 may check if the values of the measurements or measurement information are within the levels determined in the control means 290 for the received measurements or measurement information, and thus classify the used water in the first water tank 210 as either "clean" or "not clean".

If the water quality is above the determined threshold level, i.e. the used water in the first water tank 210 is classified as "clean", the recycling device 200 may proceed to Action 204. However, if the water quality is below the determined threshold level, i.e. the used water in the first water tank 210 is classified as "not clean", the recycling device 200 may proceed to Action 205.

Action 204

In this action, the recycling device 200 may either store the used water in a second water tank 220 in the recycling device 200, or recycle the used water out of the recycling device 200 from the first water tank 210. However, it should also be noted that according to some embodiments, the recycling device 200 may also recycle used water stored in the second water tank 220 out of the recycling device 200 from the second water tank 220.

In some embodiments, the recycling device 200 may recycle the used water out of the recycling device 200 from the first water tank 210 or from the second water tank 220 when at least one water consumption device 100, 102 connected to the recycling device 200 is determined to be in need of water. According to one example, the control means 290 may determine that at least one water consumption device 100, 102 connected to the recycling device 200 is in need of water or not by receiving information from the at least one water consumption device 100, 102 that it is in need of water, e.g. via an electrical or wireless connection between the at least one water consumption device 100, 102 and the recycling device 200. Alternatively, the control means 290 may determine that at least one water consumption device 100, 102 connected to the recycling device 200 is in need of water or not by communicating with an additional flow meter and controlling additional valves as described below with reference to FIGS. 3-6.

In other words, if the used water in the first water tank 210 is classified as "clean" by the control means 290 in the recycling device 200 and the at least one water consumption device 100, 102 is asking for water, the used water from the first water tank 210 may be sent directly to the at least one water consumption device 100, 102.

However, if the used water in the first water tank 210 is classified as "clean" by the control means 290 in the recycling device 200 and the at least one water consumption device 100, 102 is not asking for water, the used water from the first water tank 210 may be sent directly to the second water tank 220 for storage, or if the second water tank 220 is full, the used water from the first water tank 210 may be sent to the sewer or any external water collector instead. Here, the used water in the second water tank 220 may be stored until the at least one water consumption device 100, 102 is asking for water, in which case used water from the second water tank 220 may be sent to the at least one water consumption device 100, 102. It should here be noted that used water stored in the second water tank 220 may in any case be sent to the at least one water consumption device 100, 102 when the at least one water consumption device 100, 102 is asking for water, such as, e.g. when the at least one water consumption device 100, 102 is asking for water and there is no used water in the first water tank 210.

Action 205

In this action, the recycling device 200 may discharge or direct the used water out from the recycling device 200, e.g. into a sewer or any external water collector, etc. In other words, if the used water in the first water tank 210 is classified as "not clean" by the control means 290 in the recycling device 200, the used water from the first water tank 210 may be sent to the sewer or any external water collector.

In some embodiments, the recycling device 200 may also discharge the used water out from the first water tank 210 when at least one water consumption device 100, 102 connected to the recycling device 200 is determined not to be in need of water and the second water tank 220 is determined to be full. Here, the control means 290 in the recycling device 200 may determine that the second water tank 220 is full via the second sensor means 221 in the recycling device 200. Optionally, the recycling device 200 may also discharge the used water out from the first water tank 210 when the control means 290 in the recycling device 200 has received information indicating that the used water in the first water tank 210 is to be discharged. For example, the control means 290 may receive information, via a connectivity device 294, from a mobile device or terminal indicating that the used water in the first water tank 210 is to be discharged. Optionally, the recycling device 200 may be fitted with one or more buttons that when pressed is arranged to indicate to the control means 290 that the used water in the first water tank 210 is to be discharged.

In some embodiments, the recycling device 200 may also discharge used water from the second water tank 220. This may be performed when the control means 290 in the recycling device 200 determines that the used water in the second water tank 220 has been stored for a determined period of time. Optionally, this may also be performed when the control means 290 in the recycling device 200 has received information indicating that the used water in the second water tank 220 is to be discharged. For example, the control means 290 may receive information, via a connectivity device 294, from a mobile device or terminal indicating that the used water in the second water tank 220 is to be discharged. Optionally, the recycling device 200 may be fitted with one or more buttons that when pressed is arranged to indicate to the control means 290 that the used water in the second water tank 220 is to be discharged. It should also be noted the control means 290 in the recycling device 200 may also receive information indicating that both the used water in the first water tank 210 and the used water in the second water tank 220 is to be discharged, e.g. wirelessly via the connectivity device 294 or via one or more buttons on the recycling device 200.

More detailed description of how the control means 290 may control the first, second, third, fourth and fifth valve 231-235 and the pump 240 is described below in reference to the embodiments of the method described in FIG. 5-6.

Figure 3:
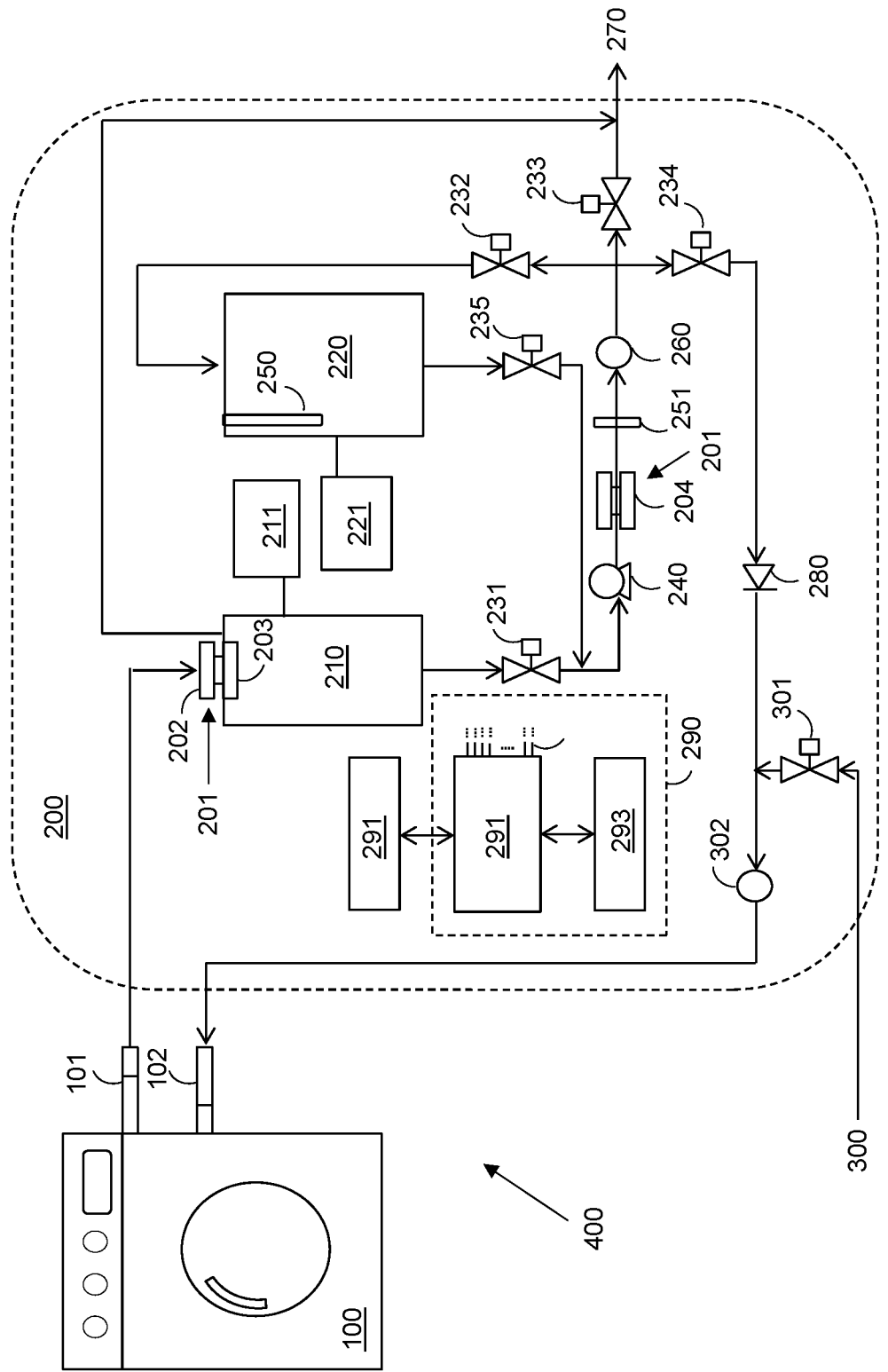
FIG. 3 is another schematic block diagram illustrating embodiments of a recycling device and a recycling system.
Figure 4:
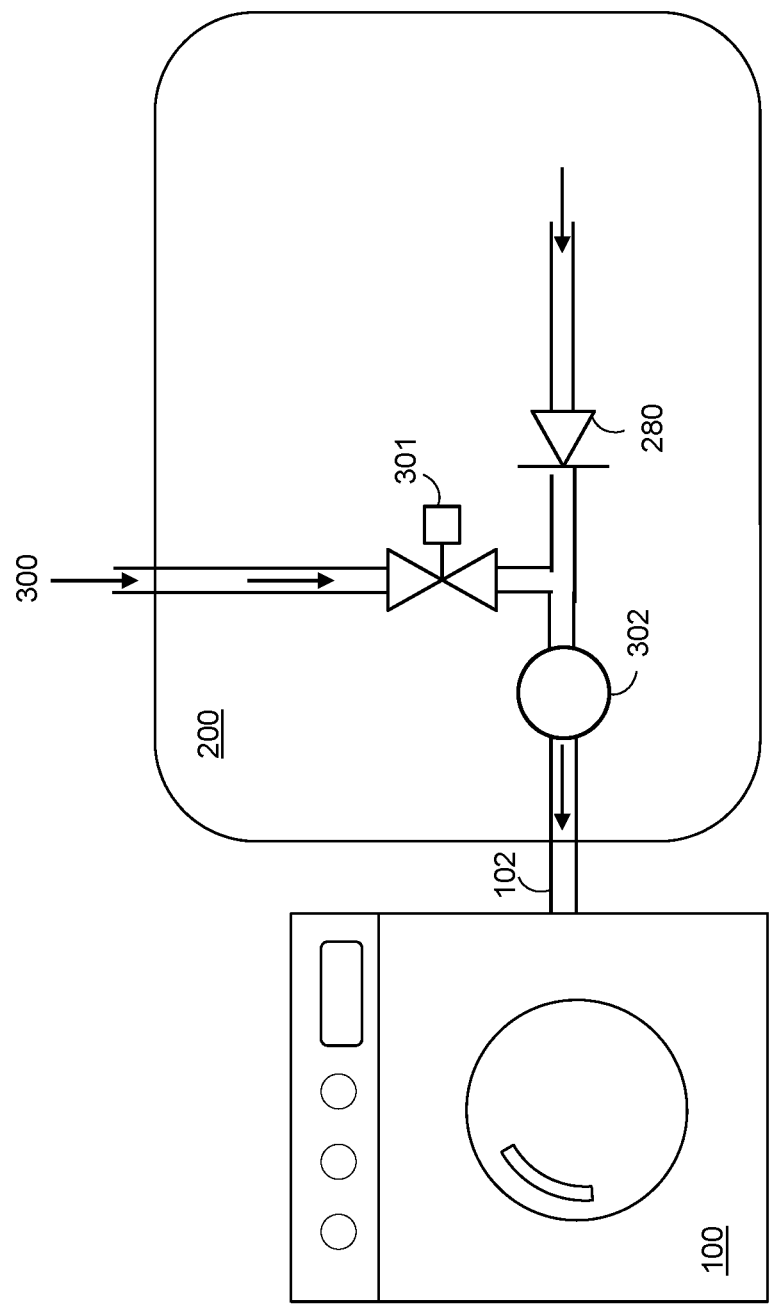
FIG. 4 is a further schematic block diagram illustrating embodiments of a recycling device.

FIGS. 3-4 depicts a recycling system 400 comprising a used water source 100 and a recycling device 200 according to embodiments described herein that is identical to FIG. 1, except in that the recycling device 200 further comprises an additional valve 301 connected to a clean water source 300, such as, e.g. a water tap or other water supply, and an additional flow meter 302. The additional flow meter 302 is arranged between the fourth valve 234 and the water inlet 102 of the water consumption device 100. The outlet of the additional valve 301 is also arranged between the fourth valve 234 and the water inlet 102 of the water consumption device 100, but also connected between the fourth valve 234 and the additional flow meter 302. This arrangement allows the control means 290 in the recycling device 200 to determine whether the water consumption device 100 is asking for water or not without being electrically or wirelessly connected to the water consumption device 100.

For example, the additional flow meter 302 may be used to detect the flow of water going to the water inlet 102 of the water consumption device 100 and the additional valve 301 may be used to allow or stop the flow of water directly from the clean water source 300 to the water inlet 102 of the water consumption device 100.

When the water consumption device 100 is asking for water, the water consumption device 100 normally opens its water inlet 102 and thus allows water to flow into the water consumption device 100. When the water consumption device 100 is no longer in need of water, i.e. not asking for water, the water consumption device 100 normally closes the water inlet 102, thus blocking the flow of water into the water consumption device 100. By allowing the additional valve 301 to be open by default when the water consumption device 100 is asking for water, water will thus flow freely from the clean water source 300 to the water consumption device 100. Consequentially, the additional flowmeter 302 will detect a flow. When the additional flowmeter 302 detects this flow, the control means 290 in the recycling device 200 may close the additional valve 301 and instead allow used water to instead flow from the first water tank 210 or the second water tank 220 to the water inlet 102 of the water consumption device 100. This may be performed when the control means 290 in the recycling device 200 has determined that there is used water in the second water tank 220 or has classified the used water in the first water tank 210 as "clean".

Once the water consumption device 100 is no longer in need of water, i.e. is not asking for water anymore, the additional flowmeter 302 will detect that there is no flow. The control means 290 in the recycling device 200 may then stop directing used water from the first water tank 210 or the second water tank 220 to the water inlet 102 of the water consumption device 100 to the water consumption device 100.

To reduce energy consumption, the additional valve 301 may be generally closed, therein restricting the provision of water to the water consumption device 100.

Instead of, or in addition to, the additional flow meter 302, a water pressure sensor may be provided to the recycling system 400. The water pressure sensor is arranged between the additional valve 301 and the water inlet 102 of the water consumption device 100. The output of the pressure sensor is detected by the control means 290. The water pressure sensor may detect a drop in pressure when the water consumption device 100 is requesting water. For example, when the water consumption device 100 requests water the pressure sensor detects that the water pressure between the additional valve 301 and the water inlet 102 drops. The additional flow meter 302 may also be used to sense when the water consumption device 100 requests water. In such a case a spike in flow rate is detected as the water consumption device 100 requests water. The spike in flow rate is caused by the flow small volume of water present between the additional flow valve 301 and the water consumption device 100 flowing past the additional flow meter 302.

This detected low pressure, and/or detected spike in flow rate will trigger either: the opening of one or more of the valves (231, 232, 233, 234, 235) to enable recycled water to flow to the water consumption device 100; or, the opening of the additional valve 301 to allow clean water to flow from the clean water source 300. Whether clean water or recycled water is used is dependent on the volume of water available in the first water tank 210, the second water tank 220, or from the outlet 101 of the water consumption device 100. This has the advantage of enabling the additional valve 301 to be generally closed, reducing energy consumption compared to a system in which the additional valve 301 is generally open and the bulk flow of fluid is measured by the additional flow meter 302.

Figure 5:
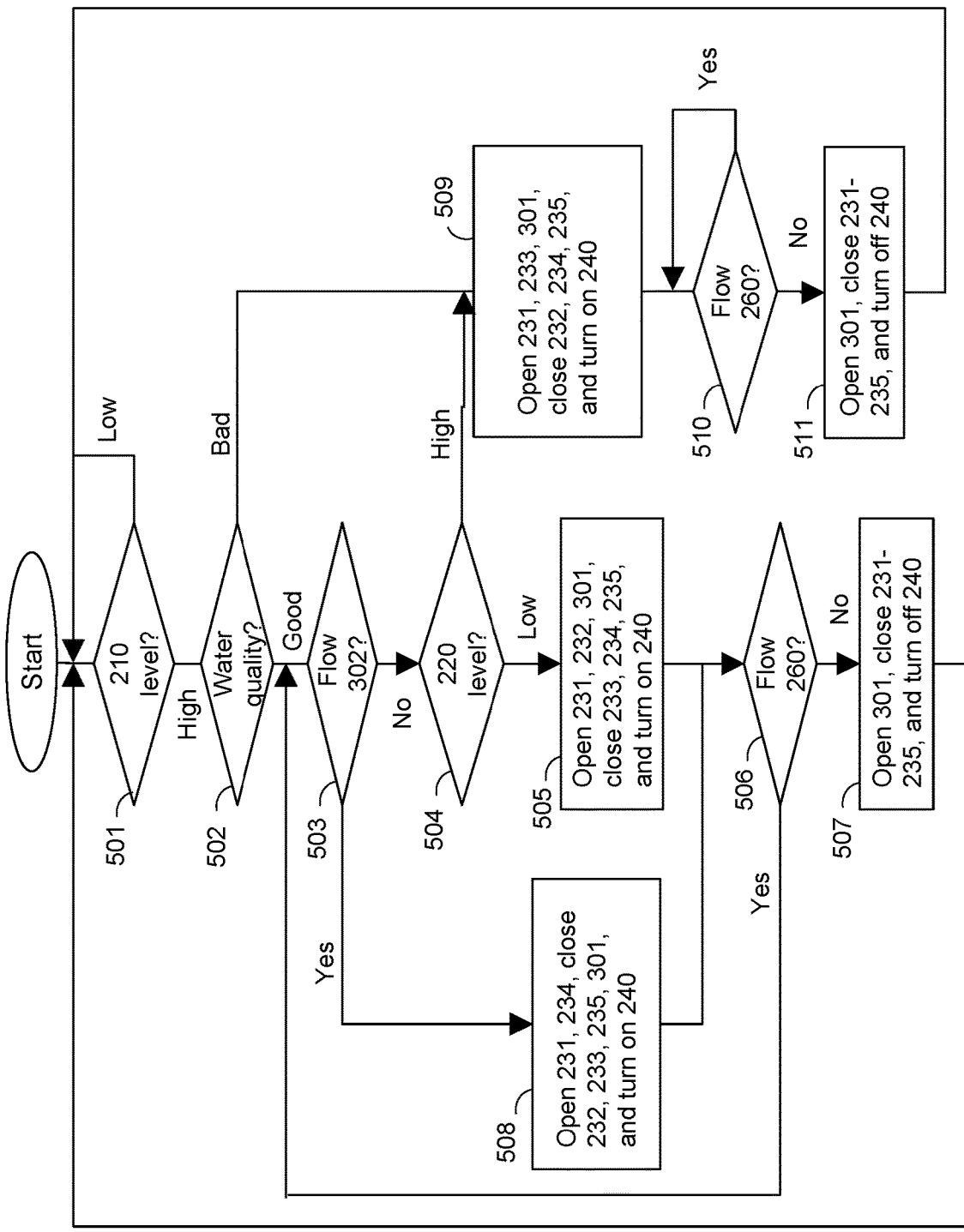
FIG. 5 is another flowchart depicting embodiments of a method in a recycling device.

FIG. 5 is an illustrated example of actions or operations which may be taken by the control means 290 in the recycling device 200 in order to control the first, second, third, fourth, fifth and additional valve 231-235, 301 and the pump 240 to perform the method described above with reference to FIG. 2. The actions below are described in term of managing the first water tank 210 and may be performed in conjunction with and after the management of the second water tank 220 described below with reference to FIG. 6.

Action 501. The control means 290 may check the water level of the used water in the first water tank 210. If the water level in the first water tank 210 is low, then there is no used water to assess in the first water tank 210. If the water level in the first water tank 210 is high, then the control means 290 may proceed to Action 502.

Action 502. The control means 290 may check the water quality of the used water in the first water tank 210. If the water quality is classified as bad or "not clean", then the control means 290 may proceed to Action 509. If the water quality is classified as good or "clean", then the control means 290 may proceed to Action 503.

Action 503. The control means 290 may check if there is a water flow detected by the additional flow meter 302. If a water flow is detected, i.e. the water consumption device 100 is asking for water, then the control means 290 may proceed to Action 508. If a water flow is not detected i.e. the water consumption device 100 is not asking for water, then the control means 290 may proceed to Action 504.

Action 504. The control means 290 may check the water level of the used water in the second water tank 220. If the water level in the second water tank 220 is high, then the control means 290 may proceed to Action 509. If the water level in the second water tank 220 is low, then the control means 290 may proceed to Action 505.

Action 505. The control means 290 may open the first, second and additional valves 231, 232, 301 and close the third, fourth and fifth valve 233, 234, 235. The control means 290 may also start or turn on the pump 240. This will cause the used water in the first water tank 210 to flow into the second water tank 220 for storage. The second water tank 220 is considered full when the used water in it reaches a certain level, this may be measured by a water level detector in the second sensor means 221. It should be noted that the additional valve 301 may stay open in this case to allow the control means 290 to determine if the water consumption device 100 is asking for water. The control means 290 may proceed to Action 506.

Action 506. The control means 290 may check if there is a water flow detected by the first flow meter 260. If a water flow is detected, then the control means 290 may proceed to Action 503. If a water flow is not detected, then the control means 290 may proceed to Action 507.

Action 507. The control means 290 may open the additional valve 301 and close the first, second, third, fourth and fifth valve 231, 232, 233, 234, 235. The control means 290 may also stop or turn off the pump 240. This will cause water to flow into the water consumption device 100 from the clean water source 300 in case the water consumption device 100 is asking for water. The control means 290 may proceed to Action 501.

Action 508. The control means 290 may open the first and fourth valves 231, 234, and close the second, third, fifth and additional valve 232, 233, 235, 301. The control means 290 may also start or turn on the pump 240. This will cause used water to flow directly from the first water tank 210 into the water consumption device 100.

Action 509. The control means 290 may open the first, third and additional valves 231, 233, 301, and close the second, fourth, and fifth valve 232, 234, 235. The control means 290 may also start or turn on the pump 240. This will cause used water to flow directly from the first water tank 210 and out of the recycling device 200 via the outlet 270, e.g. the used water in the first water tank 210 is discharged or discarded. The control means 290 may proceed to Action 510.

Action 510. The control means 290 may check if there is a water flow detected by the first flow meter 260. If a water flow is detected, then the control means 290 may keep measuring the water flow until a water flow is not detected anymore. If a water flow is not detected, then the control means 290 may proceed to Action 511.

Action 511. The control means 290 may keep the additional valve 301 open and close the first, second, third, fourth and fifth valve 231, 232, 233, 234, 235. The control means 290 may also stop or turn off the pump 240. This will cause water to flow from the clean water source 300 in case the water consumption device 100 is asking for water. The control means 290 may proceed to Action 501.

Figure 6:
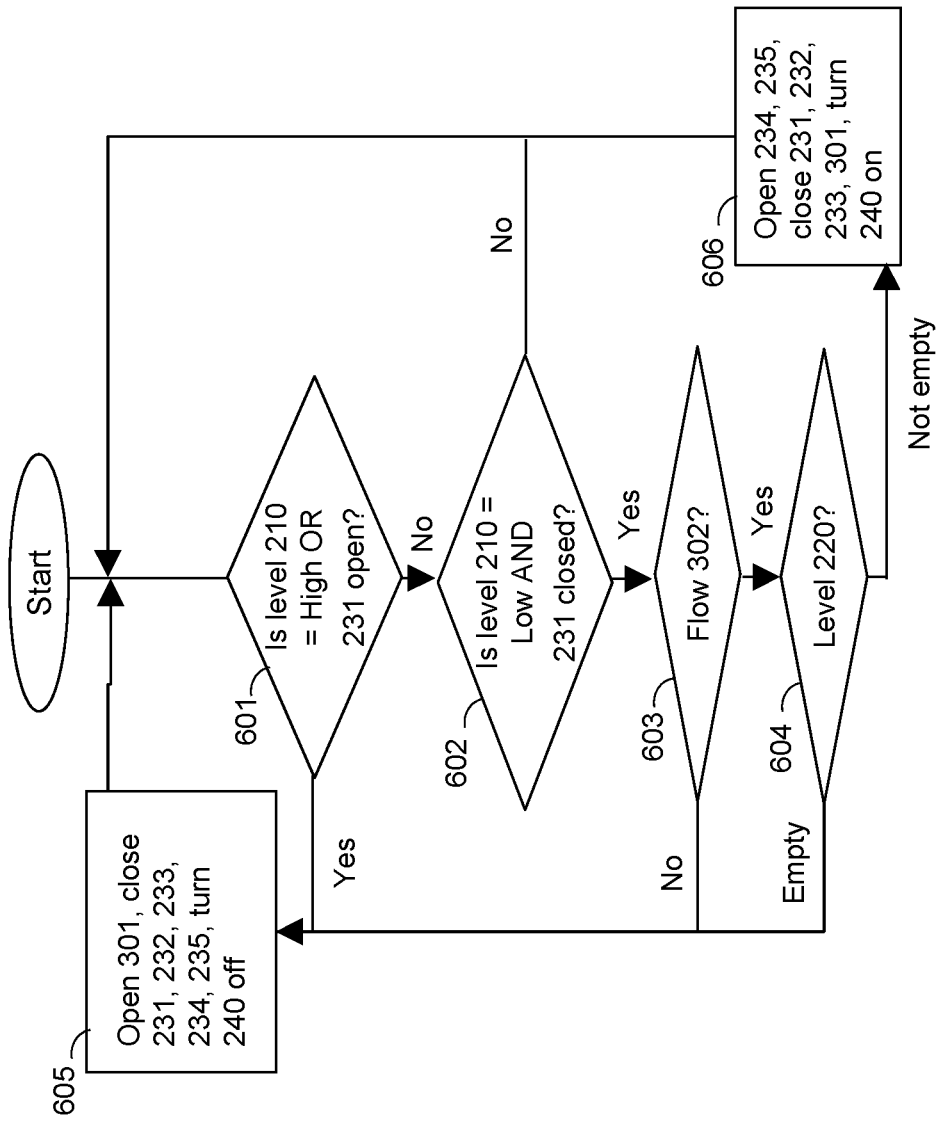
FIG. 6 is another flowchart depicting embodiments of a method in a recycling device.

FIG. 6 is an illustrated example of actions or operations which may be taken by the control means 290 in the recycling device 200 in order to control the first, second, third, fourth, fifth and additional valve 231-235, 301 and the pump 240 to perform the method described above with reference to FIG. 2. The actions below are described in term of managing the second water tank 220 and may be performed in conjunction with and before the management of the first water tank 210 described above with reference to FIG. 5.

Action 601. The control means 290 may check the water level of the used water in the first water tank 210 and if the first valve 231 is open or closed. If the water level in the first water tank 210 is high or the first valve 231 is open, then the control means 290 may proceed to Action 605. Otherwise, the control means 290 may proceed to Action 602.

Action 602. The control means 290 may check if the water level of the used water in the first water tank 210 is low and if the first valve 231 is closed. If so, the control means 290 may proceed to Action 603. If not, the control means 290 may proceed to Action 601.

Action 603. The control means 290 may check if there is a water flow detected by the additional flow meter 302. If a water flow is not detected, then the control means 290 may proceed to Action 605. If a water flow is detected, then the control means 290 may proceed to Action 604.

Action 604. The control means 290 may check the water level of the used water in the second water tank 220 is empty. If so, then the control means 290 may proceed to Action 605. If not, then the control means 290 may proceed to Action 606.

Action 605. The control means 290 may open the additional valves 301, and close the first, second, third, fourth, and fifth valve 231, 232, 233, 234, 235. The control means 290 may also stop or turn off the pump 240. This will cause water to flow from the clean water source 300 in case the water consumption device 100 is asking for water.

Action 606. The control means 290 may open the fourth and fifth valves 234, 235, and close the first, second, third, and additional valves 231, 232, 233, 301. The control means 290 may also start or turn on the pump 240. This will cause used water to flow from the second water tank 220 into the water consumption device 100 when the water consumption device 100 is asking for water.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

The invention claimed is:

1. A recycling device (200) for recycling used water from at least one used water source (100, 101), wherein the recycling device (200) comprises
a first water tank (210) arranged to receive used water from the at least one water source (100),
a first sensor means (211) arranged to measure the water quality of used water in the first water tank (210),
a second water tank (220) arranged to receive used water from the first water tank and to store used water within the recycling device (200),
a water pump (240) and one or more valves (231, 232, 233, 234, 235; 301) arranged in the recycling device (200) such that used water from the first water tank is able to be stored in the second water tank (220) when the water quality of the used water is above a determined threshold level, and wherein the water pump (240) and one or more valves (231, 232, 233, 234, 235; 301) further arranged in the recycling device (200) such that used water from the first water tank stored in the second water tank (220) is able to be recycled out of the recycling device (200) from the second water tank (212),
a second sensor means (221) arranged to measure the amount of used water in the second water tank (220), and
a control means (290) configured to control the water pump (240) and the one or more valves (231, 232, 233, 234, 235; 301) based on the amount of used water in the second water tank (220) indicated by the second sensor means (221), and to recycle the used water out of the recycling device (200) from the second water tank (220) when at least one water consumption device (100, 102) connected to the recycling device (200) is determined to be in need of water.

2. The recycling device (200) according to claim 1, wherein the control means (290) is configured to control the pump (240) and the one or more valves (231, 232, 233, 234, 235; 301) to discharge used water out from the first water tank (210) when the second water tank (220) is determined to be full and at least one water consumption device (100, 102) connected to the recycling device (200) is determined not to be in need of water, or when information indicating that the used water in the first water tank (210) is to be discharged has been received.

3. The recycling device (200) according to claim 1, wherein the control means (290) is configured to control the pump (240) and the one or more valves (231, 232, 233, 234, 235; 301) to discharge stored used water from the second water tank (220) when the stored used water in the second water tank (220) is determined to have been stored for a determined period of time or information indicating that the stored used water in the second water tank (220) is to be discharged has been received in the control means (290).

4. The recycling device (200) according to claim 1, wherein the control means (290) is configured to control an antimicrobial system (250) provided in the second water tank (220) to avoid microbial growth in the second water tank (220).

5. The recycling device (200) according to claim 1, wherein the control means (290) which is connected to or comprise a connectivity device (294) configured to wirelessly communicate with external devices.

6. The recycling device (200) according to claim 1, wherein the control means comprises a processor (291) and a memory (293), wherein the memory (293) is containing instructions executable by the processor (291).

7. The recycling device (200) according to claim 1, further comprising a first filtering means (201) arranged to filter the used water from the at least one used water source (100, 101) and/or a second filtering means (204) arranged to filter used water from the first water tank (210) and the second water tank (220).

8. The recycling device (200) according to claim 7, wherein the first and/or second filtering means (201, 204) comprise a pre-filter (202, 205) and a subsequent filter (203, 206), wherein the subsequent filter (203, 206) has a pore size which is lower than a pore-size of the pre-filter (202, 205).

9. The recycling device (200) according to claim 1, wherein the control means (290) is configured to control the pump (240) and the one or more valves (231, 232, 233, 234, 235; 301) based on the measured water quality from the first sensor means (211), wherein the measured water quality from the first sensor means (211) comprise, in addition to RGB color, one or more of: the electrical conductivity, the temperature and the turbidity of the used water within the first water tank (210).

10. The recycling device (200) according to claim 9, wherein the first sensor means (211) is further arranged to measure the amount of used water in the first water tank (210), and wherein the control means (290) is further configured to control the pump (240) and the one or more valves (231, 232, 233, 234, 235; 301) based on the amount of used water in the first water tank (210) indicated by the first sensor means (211).

11. The recycling device (200) according to claim 1, wherein the second sensor means (221) is further arranged to measure the water quality of the used water in the second water tank (220), wherein the measured water quality from the second sensor means (221) comprise one or more of: the electrical conductivity, the temperature and the turbidity of the used water within the second water tank (220) and wherein the control means (290) is further configured to control the pump (240) and the one or more valves (231, 232, 233, 234, 235; 301) based on the measured water quality from the second sensor means (221).

12. The recycling device (200) according to claim 1, wherein the at least one used water source (100, 101) comprises a water outlet (101) connectable to a drain, and the water consumption device (100, 102) comprises a water inlet connectable to a clean water source (300).

13. A recycling system (400) comprising at least one used water source (100, 101), a water consumption device (100, 102), and a recycling device (200) according to claim 1.

14. The recycling system (400) according to claim 13, wherein the water consumption device (100, 102), and the used water source (100, 101) are the same device.

15. A method performed in a recycling device (200) for recycling used water from at least one used water source (100, 101), the method comprising:
- receiving (201) used water from the at least one water source (100) in a first water tank (210);
- measuring (202) the water quality of used water in the first water tank (210);
- determining (203) if the water quality of used water is above or below a determined threshold level;
- if the water quality is above the determined threshold level, storing (204) the used water from the first water tank in a second water tank (220) for recycling to the at least one water source (100);
- measuring the amount of used water in the second water tank (220);
- controlling a water pump (240) and one or more valves (231, 232, 233, 234, 235; 301) based on the amount of used water in the second water tank (220); and
- recycling the used water out of the recycling device (200) from the second water tank (220) to the at least one water source (100) when at least one water consumption device (100, 102) connected to the recycling device (200) is determined to be in need of water.

* * * * *